Patented Nov. 27, 1934

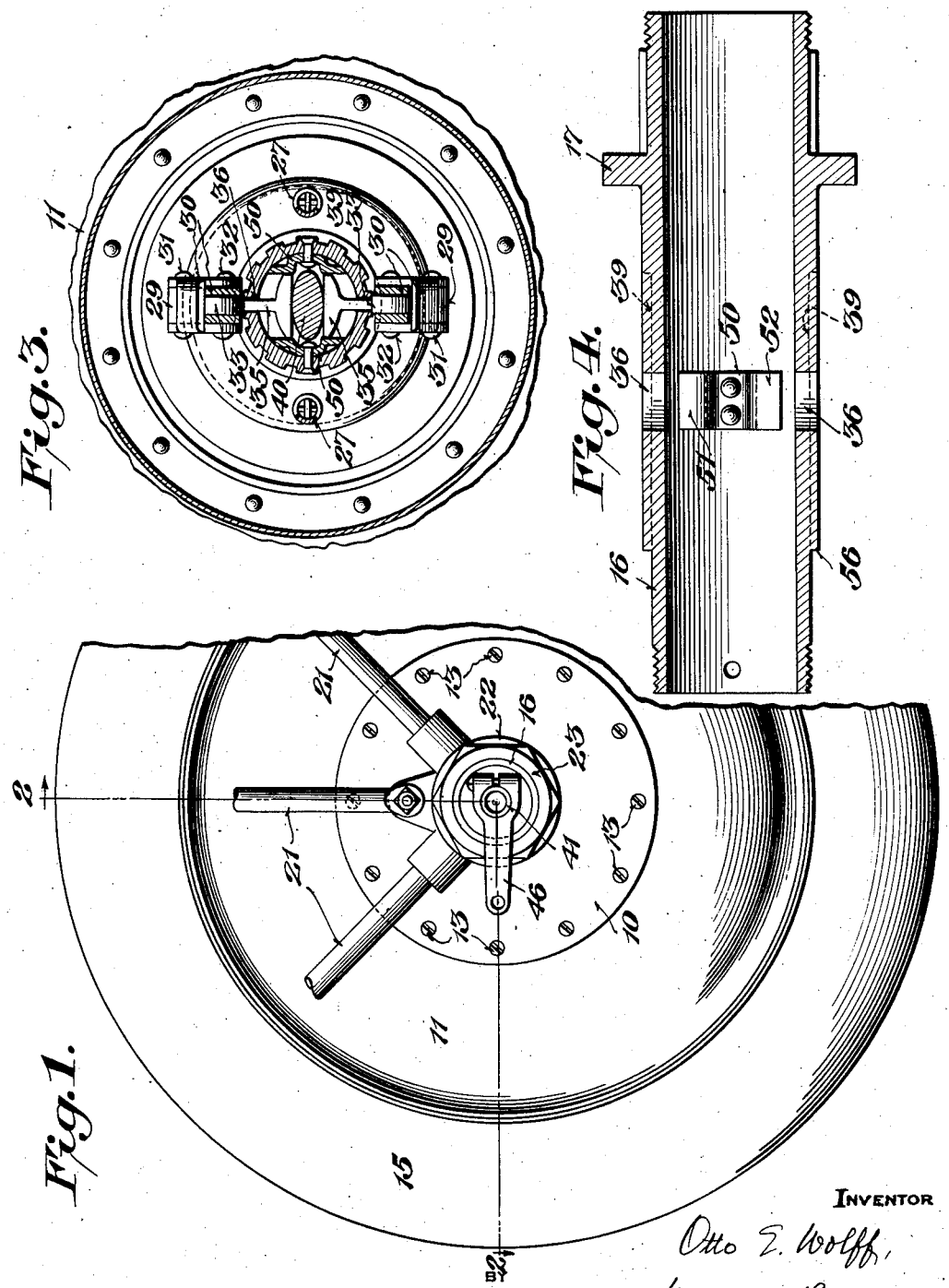

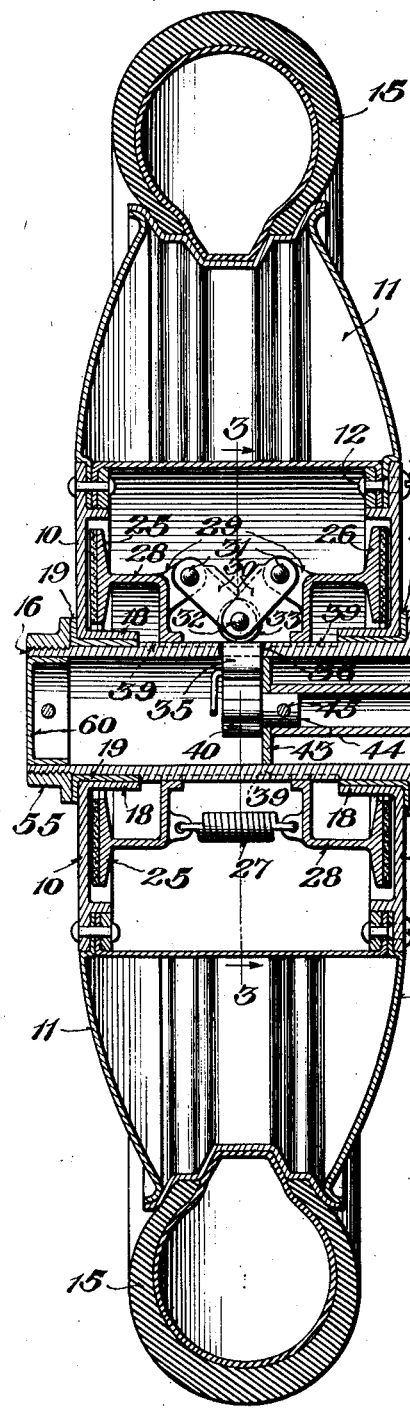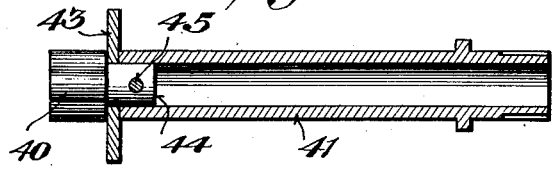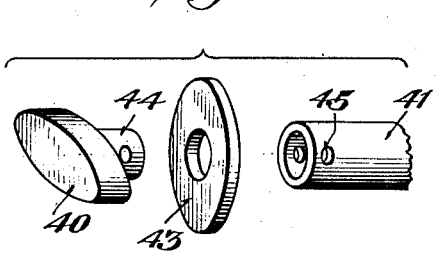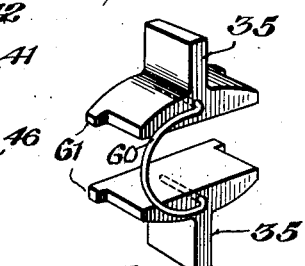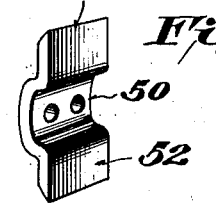

1,982,617

UNITED STATES PATENT OFFICE 1,982,617

BRAKE FOR AIRPLANE LANDING GEAR

Otto E. Wolff, New York, N. Y.

Application December 4, 1928, Serial No. 323,629

26 Claims. (Cl. 188—18)

This invention relates to the construction of braking mechanism adapted specially for airplane landing gear, but applicable, wholly or in part, to other uses.

The general object of the invention is to produce a braking mechanism characterized by simplicity, compactness, efficiency, lightness, non-exposure to weather, ease of assemblage, and other characteristics desirable for the special conditions in which the mechanism is to be employed.

More specifically it is the object of this invention to provide a compact, weatherproof brake whose moving parts are all housed within the wheel; a brake whose friction surfaces have a maximum braking efficiency and a maximum area, so as to insure rapid heat dissipation; one in which there is no liability of oil reaching the braking surfaces; a brake which has perfect equalization of action and evenness of wear regardless of inaccurately aligned wheels; a brake capable of powerful action with a relatively small pedal movement; one in which the mechanism is very accessible, and which is easily dismembered and reassembled; one in which weight is reduced and compactness is gained by locating the brake unit close to the center of the wheel.

The accompanying drawings illustrate by way of example an embodiment of the invention which may be advantageously employed, Fig. 1 being a side elevation of part of the inner face of one of the landing wheels of an airplane; Fig. 2 a section on line 2—2 of Fig. 1; Fig. 3 a section of the hollow axle on line 3—3 of Fig. 2; Fig. 4 a longitudinal section of said axle; Fig. 5 a detail partly in section of the brake-operating spindle; Figs. 6, 7, 8 and 9 being details in perspective of various parts.

The wheel is of the disk type. It comprises two main parts, a central drum 10, in which the braking mechanism is housed, and a hollow annular chamber 11, which encircles the drum 10, and is secured thereto as by rivets 12 and bolts 13; the outer rim of said chamber 11 being concaved in cross section and suitably configured to form a seat for the pneumatic tire 15.

Drum 10 is in effect a hollow hub. It is mounted for rotation upon a hollow axle 16, shown in detail in Fig. 4. Said drum has inturned flanges 18, 18 (Fig. 2) to which are fastened flanged bushings 19 of any suitable anti-friction material; these bushings constituting the bearing surfaces of the wheel and being in contact with the outer surface of axle 16, while all other parts of the wheel are clear thereof.

The manner of attachment of the axle to the landing gear struts will differ according to the special requirements of each of the various types of landing gear. As shown in Figs. 1 and 2, the struts 21 carry a strap 22 which encircles the axle 16, and which may be attached thereto by a spline and groove connection. Strap 22 is held in place by a nut 23, threaded on the axle; and which clamps it against thrust flange 17 on said axle. Or it may be welded to the latter.

The braking elements comprise the two annular disks 25, 26, each of which has a braking surface which serves as a brake shoe. Each disk is carried by, being preferably formed integrally with, a cup shaped annular support 28 through which the axle passes. The acting faces of these disks are in vertical planes and are contiguous respectively to the vertical faces of the inside of drum 10. The supports 28 of the braking disks 25, 26 are splined at 39 (Figs. 2 and 4) to the axle 16, so as to be capable of a slight but sufficient movement lengthwise thereof; and they are normally held out of contact with the surfaces of drum 10 by the retractive action of coil springs 27; there being preferably two of these retraction springs (one of which is shown in Fig. 2) located diametrically opposite each other, as indicated in Fig. 3.

Disks 25, 26 are pressed into braking contact with the co-acting surfaces of the wheel by means of a toggle lever movement shown in Figs. 2 and 3. Each of the cup-shaped supports 28 has a projecting stud or lug 29, integral therewith; and to each stud one end of a toggle arm or link 30, composed of two identical and parallel members (see Fig. 3), is pivoted at 31. The opposite ends of the toggle links 30 meet and are pivoted together at 32; and pivot 32 carries also an anti-friction roller 33. There are two of these rollers, diametrically opposite each other, and each rests in contact with the end of a toggle actuating member which may be in the form of a pusher or lifter 35, (shown in detail in Fig. 7) which works through a slot 36 (Fig. 4) in the axle 16, and by means of which the toggle movement is actuated for application of the brake. By the retractive force of springs 27 the disks 25, 26 are drawn towards each other, thereby normally pressing the lifting piece or pusher 35 towards the center of the axle. In this position of the parts the upper surface of lifter 35 is approximately flush with the outer surface of the axle. This is the normal position of the parts, and they are thus shown in Figs. 2 and 3. It is obvious however that, by moving lifter 35 outwardly or away from the axis of the wheel, the toggle arms will be actuated in a direction to force disks 25, 26 away from each other and into braking contact with the co-acting surfaces of the wheel. This braking action is effected by means of a cam 40, fixed to the inner end of a spindle 41 (Figs. 2, 5 and 6) which is supported in bearings, within axle 16, and concentrically therewith.

There are preferably two of these brake actuating toggle movements, and they are located diametrically opposite each other, as shown in Fig. 3. This arrangement has various advantages, one of them being that a single cam 40 serves to actuate the lifters 35 (Fig. 7) and thereby to actuate both the toggle movements simultaneously. The two lifters 35 are preferably connected together by a bent spring 60, which further tends to return them to normal position when the brake is released.

It has been already stated that the two retraction springs 27 are located diametrically opposite to each other, and by reference to Fig. 3 it will be seen that the retraction springs and toggle levers alternate with each other, each spring being ninety degrees from the toggle lever on each side of it.

As illustrated in Fig. 9, the toggle links 30 instead of being formed of two parallel members bolted together may be formed each of a single piece bent over into such shape that its two sides are parallel and are separated by a space of proper width to acccommodate roller 33.

Details of the mounting of cam 40 are shown in Fig. 6. Spindle 41 has a bearing in collar 42 fixed in the outer end of the hollow axle 16, and at its inner end it carries a disk 43, which is free to rotate within the bore of said axle. Cam 40 is on the inner side of disk 43 and has a cylindrical stem 44 which passes through said disk and is fixed at 45 to the inner end of spindle 41. Cam 40 may, of course, be integral with said spindle. The latter has at its outer end an operating crank arm 46, which may be connected by means such as are usually employed for that purpose with an operating pedal.

Lifters 35 work between the two guides 50, each of which has two guide faces 51, 52 (Fig. 8). Guides 50 are riveted to the inner surface of hollow axle 16. When cam 40 is turned to operate the brake disks the lifters are moved radially with respect to axle 16 in opposite directions (Fig. 3).

Each lifter 35 has spurs 61 on one side of the flat inner face thereof with which cam 40 makes contact, the object of spurs 61 being to prevent the lifter from slipping toward the outer side of the axle. Washer 43 on spindle 41 prevents any movement inwardly. The spurs slide against the edges of lifter guides 50, the guides being somewhat narrower than the lifter.

The hollow axle 16 is closed at its outer end by a tight fitting cap 60 (Fig. 2).

It will be observed that the brake and its actuating mechanism are completely housed within the hub of the wheel, the entire assembly being waterproof without the use of packing; that the area of the braking surface is relatively great and the working parts are relatively few, simple and compact; that the brake-actuating toggle mechanism is simple and powerful; and that the described construction of the pair of braking disks provides a self-equalizing brake and eliminates end thrust.

It is further to be observed that the described brake-mechanism is very accessible for repairs, and that it can be readily assembled and disassembled. The wheel in its entirety is held on the axle 16 between thrust flange 17 integral with the latter, and the holding nut 55 (Fig. 2); the wear and friction being taken entirely by the bushed bearings 19 whose horizontal surfaces bear against the axle and their vertical surfaces against flange 17 and nut 55 respectively. When nut 55 is removed the wheel can be slid bodily off the axle, carrying with it the brake disks 25, 26 and their supports 28, the toggle levers 30 and the bushed bearings 19. In other words, the wheel and parts of the brake mechanism enclosed therein are demountable as a unit from the axle. The toggle lifters do not obstruct this movement, for their outer edges are normally flush with the outer surface of axle 16. In the removal and in the replacement of the wheel the splines on the disk supports 28 slide out of and into the grooves or key ways 39 in the axle (Fig. 4). The latter is enlarged in diameter beginning at the shoulder 56 to provide sufficient depth for the grooves or keyways 39.

By removing screws 13 the right hand vertical wall of drum 10 may be removed from the annular chamber 11.

What is claimed is:

1. In a wheel braking mechanism, the combination with an axle and a wheel having between opposite side walls thereof a hollow portion or chamber surrounding said axle, of a pair of disks within said chamber and carried by said axle, said disks having each a braking surface, and mechanical actuating means also housed within said wheel chamber for forcing said disks in opposite directions each into braking contact with a co-acting surface on the interior of the wheel chamber.

2. In a wheel braking mechanism, the combination with an axle and a wheel having between opposite side walls thereof a hollow portion or chamber surrounding said axle, of a pair of disks within said chamber and carried by said axle, said disks having each a braking surface, and toggle means also housed within said wheel chamber for forcing said disks in opposite directions each into braking contact with a co-acting surface on the interior of the wheel chamber.

3. In a wheel braking mechanism, the combination with the hollow wheel mounted on a hollow axle, of a pair of disks within said wheel and carried by the axle thereof, said disks having each a braking surface, actuating means also housed within said wheel for forcing said disks in opposite directions each into braking contact with a co-acting surface on the interior of the wheel, power transmitting means within said axle, and spring means for holding said disks normally out of braking contact.

4. The combination with a wheel having a hollow hub and a hollow axle on which said wheel is rotatably mounted, of a pair of braking disks within said wheel each carried by an annular support which encircles and is carried by said axle, and means actuated from within said axle for forcing said disks in opposite directions each into braking contact with co-acting surfaces on the wheel.

5. The combination with a wheel having a hollow hub and a hollow axle on which said wheel is rotatably mounted, of a pair of braking disks within said wheel each carried by said axle, and leverage means actuated from within said axle for forcing said disks in opposite directions each into braking contact with co-acting surfaces on the wheel.

6. The combination with a wheel and a hollow axle on which said wheel is rotatably and demountably supported, of a pair of annular braking disks which encircle said axle, a lever or levers connected with said disks for forcing them simultaneously in opposite directions into contact with co-acting surfaces on said wheel, actuating means for said levers positively operated from within said hollow axle, and retractive springs tending to draw and hold said disks out of their braking position.

7. The combination with a wheel and a hollow axle on which said wheel is rotatably and demountably supported, of a pair of annular braking disks which encircle said axle, a plurality of toggle levers connected with said disks for forcing them simultaneously in opposite directions into contact with co-acting surfaces on said wheel, actuating means for said toggle levers including a cam within said hollow axle, and a connecting member or lifter between said cam and each of said toggle levers, and retractive springs connecting said disks with each other.

8. The combination of a wheel having a hollow hub, a hollow axle, a pair of annular braking disks concentrically arranged within said hub and having a spline and groove connection with said axle, toggle mechanism for forcing said disks simultaneously apart, and actuating means therefor located within said axle, said wheel being demountably supported on said axle.

9. In a wheel braking mechanism, the combination with a wheel, and a hollow axle on which the wheel is rotatably mounted, of a pair of braking disks within the wheel and carried by said axle, each disk having a braking surface contiguous to a coacting wall of the wheel, actuating means for moving said disks into engagement with said walls respectively, and power transmitting means within said axle.

10. In a wheel braking mechanism, the combination with a wheel, and a hollow axle on which the wheel is rotatably mounted, of a pair of braking disks within the wheel and mounted upon said axle to move longitudinally thereof, each disk having a braking surface contiguous to a coacting wall of the wheel, actuating means for moving said disks into engagement with said walls respectively, and power transmitting means within said axle.

11. The combination with a wheel having a hollow hub and a hollow axle upon which said hub is rotatably mounted, of a pair of braking disks within said hub, carried by said axle and having braking surfaces for cooperation with contiguous braking surfaces on the inner walls of said hub, means comprising a toggle movement for forcing said disks into operative engagement with said walls, and connections within said axle for actuating said toggle movement, said connections comprising a lifter or pusher movable in a radial direction through an opening in the wall of said axle.

12. The combination with a wheel having a hollow hub and a hollow axle upon which said hub is rotatably mounted, of a pair of braking disks within said hub, carried by said axle and having braking surfaces for cooperation with contiguous braking surfaces on the inner walls of said hub, means comprising a toggle movement for forcing said disks into operative engagement with said walls, and connections within said axle for actuating said toggle movement, said connections comprising a lifter or pusher movable in a radial direction through an opening in the wall of said axle, said lifter or pusher being in contact with but disconnected from said toggle movement.

13. The combination with a wheel and a hollow axle on which said wheel is rotatably and demountably supported, of a pair of annular braking disks mounted on said axle to move longitudinally thereof, one or more toggle movements connected with said disks for forcing them simultaneously in opposite directions into operative engagement with coacting surfaces on said wheel, and actuating devices for said toggle movements located within said axle and including one or more parts movable in a radial direction.

14. The combination with a wheel and a hollow axle on which said wheel is rotatably and demountably supported, of a pair of annular braking disks slidably mounted on said axle, a plurality of toggle movements connected with said disks for forcing them simultaneously in opposite directions into operative engagement with coacting surfaces on said wheel, and actuating devices for said toggle movements located within said axle, said actuating devices comprising lifters movable radially in opposite directions and a cam which acts simultaneously upon both said lifters.

15. The combination with a hollow wheel and an axle on which said wheel is rotatably mounted, of a pair of braking disks within said wheel and carried by said axle, a plurality of toggle movements connected with said disks for forcing them simultaneously in opposite directions into operative engagement with coacting surfaces on said wheel, their line of movement being parallel with the axis of the wheel, and actuating means for said toggle movements comprising a single cam and its operating connections.

16. The combination with an axle, of a wheel rotatable on said axle and having a hollow portion surrounding the same; braking means within said hollow portion of the wheel adapted to be moved into engagement with a cooperating surface of the wheel; and brake actuating means extending within said axle longitudinally thereof and into said hollow portion of the wheel to said braking means and including one or more parts having movement within the wheel in a direction transverse to said axle.

17. The combination with an axle, of a wheel rotatable on said axle and having a hollow portion surrounding the same; braking means within said hollow portion of the wheel; and brake actuating means, part thereof being movable within said axle and imparting radial movement to another part thereof within said hollow portion of the wheel.

18. The combination with an axle of a wheel rotatable on said axle and having a hollow portion surrounding the same; braking means within said hollow portion of the wheel and movable longitudinally of said axle in applying and releasing the brake; and brake actuating means acting to transmit power radially of the axle and then longitudinally thereof to said braking means.

19. The combination with an axle, of a wheel rotatable on said axle and having a hollow portion surrounding the same; braking means within said hollow portion of the wheel and movable longitudinally of said axle in applying and releasing the brake; and brake actuating means, part thereof being movable within said axle and acting to transmit power radially of said axle to another part of said means within said wheel and whereby said braking means are moved longitudinally of the axle.

20. The combination with an axle, of a wheel rotatable on said axle and having a hollow portion surrounding the same; two braking disks within said hollow portion of the wheel and mounted on said axle to be movable longitudinally thereof into engagement respectively with braking surfaces on the two end walls of said hollow portion of the wheel; and brake actuating means extending within said axle longitudinally thereof and into said hollow portion of the wheel to said disks.

21. The combination with an axle, of a wheel rotatable on said axle and having a hollow portion surrounding the same; two braking disks within said hollow portion of the wheel and mounted on said axle to be movable longitudinally thereof into engagement respectively with braking surfaces on the two end walls of said hollow portion of the wheel; and brake operating mechanism including means movably mounted within said axle and actuating other means within said hollow portion of the wheel and by which movement is imparted to said brake disks.

22. The combination with an axle, of a wheel rotatable on said axle and having a hollow portion surrounding the same; braking means within said hollow portion of the wheel adapted to be moved into engagement with a cooperating surface of the wheel; and brake actuating means extending through said axle longitudinally thereof and into said hollow portion of the wheel to said braking means, said wheel and parts of the braking means within the same being demountable as a unit from said axle.

23. The combination with an axle, of a wheel rotatable on said axle and having a hollow portion surrounding the same; two braking disks within said hollow portion of the wheel and mounted on said axle to be movable longitudinally thereof into engagement respectively with braking surfaces on the two end walls of said hollow portion of the wheel; and brake operating mechanism including means movably mounted within said axle and actuating other means within said hollow portion of the wheel and by which movement is imparted to said brake disks—said wheel and parts within the same being demountable as a unit from said axle.

24. The combination with an axle, of a wheel rotatable on said axle and having a hollow portion surrounding the same; braking means within said hollow portion of the wheel; and brake actuating means, part thereof being movable within said axle and adapted to actuate one or more other pivotally movable parts thereof.

25. The combination with an axle, of a wheel rotatable on said axle and having a hollow portion surrounding the same; braking means within said hollow portion of the wheel; and brake actuating means, part thereof being movable within said axle and adapted to impart pivotal movement to one or more other parts thereof having pivotal support within the wheel.

26. The combination with a wheel having a hollow hub and a hollow axle on which said wheel is rotatably mounted, of a pair of braking disks within said wheel and each supported from said axle; and mechanical connections actuated from within said axle for forcing said disks in opposite directions each into braking contact with coacting surfaces on the wheel.

OTTO E. WOLFF.